US012597327B2

(12) United States Patent
Munemasa et al.

(10) Patent No.: US 12,597,327 B2
(45) Date of Patent: Apr. 7, 2026

(54) INTRUSION DETECTION SYSTEM

(71) Applicant: KOBELCO CONSTRUCTION MACHINERY CO., LTD., Hiroshima (JP)

(72) Inventors: Yoshiki Munemasa, Hiroshima (JP); Yukihiro Hoso, Hiroshima (JP); Sho Fujiwara, Hiroshima (JP); Shingun Kyu, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 194 days.

(21) Appl. No.: 18/570,459

(22) PCT Filed: Mar. 8, 2022

(86) PCT No.: PCT/JP2022/009855
§ 371 (c)(1),
(2) Date: Dec. 14, 2023

(87) PCT Pub. No.: WO2023/276285
PCT Pub. Date: Jan. 5, 2023

(65) Prior Publication Data

US 2024/0290184 A1 Aug. 29, 2024

(30) Foreign Application Priority Data

Jun. 29, 2021 (JP) ................................ 2021-107592

(51) Int. Cl.
*G08B 13/196* (2006.01)

(52) U.S. Cl.
CPC . *G08B 13/19634* (2013.01); *G08B 13/19682* (2013.01)

(58) Field of Classification Search
None
See application file for complete search history.

(56) References Cited

U.S. PATENT DOCUMENTS

2019/0020867 A1* 1/2019 Akanuma .............. H04N 23/64
2019/0360172 A1* 11/2019 Yamamoto .............. E02F 9/226
(Continued)

FOREIGN PATENT DOCUMENTS

AU 2009262021 A1 * 12/2009 .............. E21F 17/18
CA 3149167 A1 * 3/2021 .............. E02F 9/267
(Continued)

OTHER PUBLICATIONS

Translation for JP2020131365 (Year: 2020).*
(Continued)

*Primary Examiner* — Ricky Chin
(74) *Attorney, Agent, or Firm* — Oblon, McClelland, Maier & Neustadt, L.L.P.

(57) ABSTRACT

The intrusion detection system includes a GNSS sensor that acquires a position of a work machine at work in a work area, a LiDAR that is disposed outside the work area and acquires point cloud data indicating a distance up to an object located inside or outside the work area, a position calculation unit that calculates positions of respective points of the point cloud data, a specifying unit that specifies a portion corresponding to the work machine from the point cloud data as specific data, based on the position of the work machine and the positions of the respective points of the point cloud data, and a detection unit that detects that an object has entered the work area, based on the point cloud data excluding the specific data.

11 Claims, 7 Drawing Sheets

(56) References Cited

U.S. PATENT DOCUMENTS

| | | | | |
|---|---|---|---|---|
| 2021/0395982 | A1* | 12/2021 | Nakazawa | E02F 9/261 |
| 2022/0064908 | A1* | 3/2022 | Hama | E02F 9/264 |
| 2022/0156914 | A1* | 5/2022 | Ono | G06V 10/764 |
| 2022/0237533 | A1* | 7/2022 | Imai | G06T 7/70 |
| 2023/0054977 | A1 | 2/2023 | Yamamoto | |
| 2023/0244244 | A1* | 8/2023 | Hanyuda | G06T 19/00 701/25 |
| 2024/0290184 | A1* | 8/2024 | Munemasa | G01C 15/002 |

FOREIGN PATENT DOCUMENTS

| | | | | | |
|---|---|---|---|---|---|
| CN | 108921925 | A | * | 11/2018 | G06F 18/241 |
| CN | 111881899 | A | * | 11/2020 | G06N 3/045 |
| CN | 112585553 | A | * | 3/2021 | G06V 20/13 |
| CN | 111445524 | B | * | 4/2021 | G06N 3/045 |
| CN | 112965494 | A | * | 6/2021 | G05D 1/0236 |
| CN | 111709988 | A | * | 9/2025 | G06F 18/23 |
| JP | 2020-051156 | A | | 4/2020 | |
| JP | 2020-111970 | A | | 7/2020 | |
| JP | 2020131365 | A | * | 8/2020 | H04N 7/18 |
| JP | 2020-193563 | A | | 12/2020 | |
| JP | 2020-194243 | A | | 12/2020 | |
| JP | 2021-060784 | A | | 4/2021 | |
| KR | 102170748 | B1 | * | 10/2020 | G06T 17/05 |
| WO | 2019/189260 | A1 | | 3/2019 | |
| WO | WO 2020/204007 | A1 | | 10/2020 | |
| WO | WO 2021/105204 | A1 | | 6/2021 | |

OTHER PUBLICATIONS

Translation for CN 111709988 (Year: 2020).*

Extended European Search Report issued Oct. 16, 2024, in European Patent Application No. 22832450.5, 6 pages.

International Search Report issued May 24, 2022 in PCT/JP2022/009855, filed on Mar. 8, 2022, 3 pages.

Office Action issued in Chinese Patent Application No. 202280043983.X on Dec. 31, 2025, (with English Translation).

* cited by examiner

INTRUSION DETECTION SYSTEM

TECHNICAL FIELD

The present invention relates to an intrusion detection system that detects an intrusion of an object into a work area.

BACKGROUND ART

Patent Literature 1 discloses an interference prevention device that sets first to sixth regions around a work machine and determines presence or absence of a person in each of the first to sixth regions. In Patent Literature 1, the presence or absence of a person is determined based on information from an object sensor disposed in the work machine.

CITATION LIST

Patent Literature

Patent Literature 1: JP 2020-111970 A

Incidentally, in a case where, from the outside of a work area, a detection is made that an object other than the work machine at work in a work area has entered the work area, the work machine at work in the work area cannot be distinguished from the object that has entered the work area, and thus the work machine at work in the work area might be erroneously detected as the object that has entered the work area.

SUMMARY OF INVENTION

It is an object of the present invention to provide an intrusion detection system capable of accurately detecting that an object other than a work machine at work in a work area has entered a work area.

The present invention provides an intrusion detection system. The intrusion detection system includes a machine position acquisition unit that acquires a position of a work machine at work inside a work area in a predetermined coordinate system, a point cloud data acquisition unit that acquires point cloud data indicating a distance from a predetermined reference point provided outside the work area to an object located inside or outside the work area, a position calculation unit that calculates positions of respective points of the point cloud data in the coordinate system, a specifying unit that specifies, as specific data, a portion corresponding to the work machine from the point cloud data, based on the position of the work machine and the positions of the respective points of the point cloud data in the coordinate system, and a detection unit that detects that another object different from the work machine has entered the work area, based on remaining portion of the point cloud data other than the specific data in the point cloud data.

DESCRIPTION OF EMBODIMENTS

Preferred embodiments of the present invention will be described below with reference to the drawings.

First Embodiment (Configuration of Work Machine)

Figure 1:
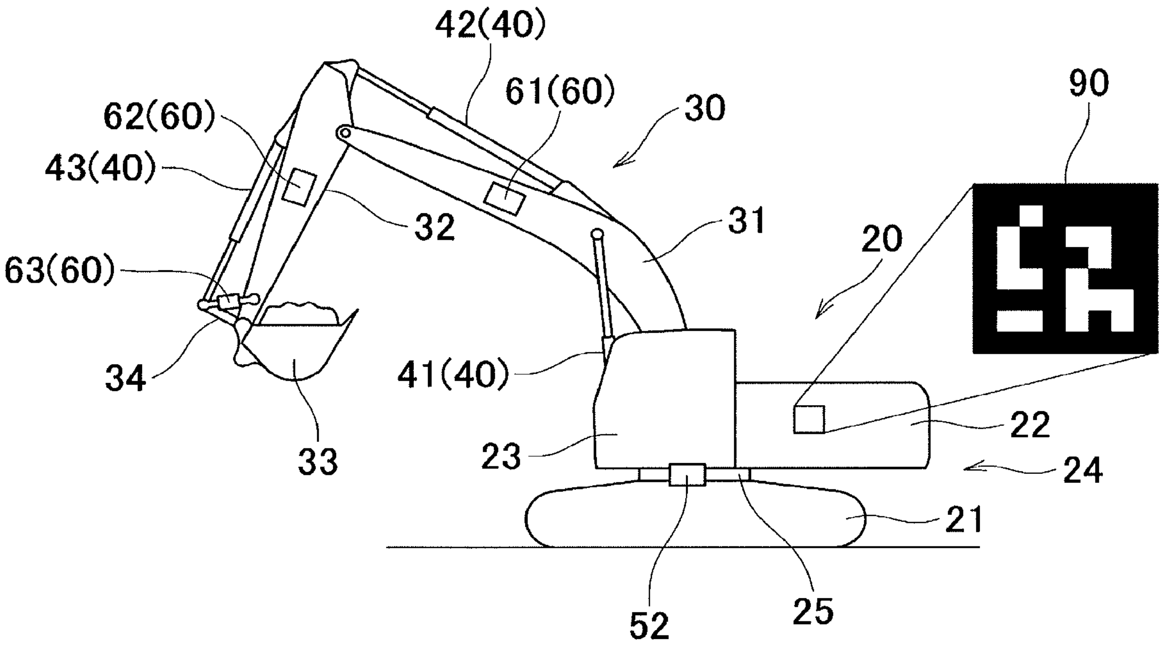
FIG. 1 is a side view of a work machine according to each embodiment of the present invention.

An intrusion detection system according to a first embodiment of the present invention detects that an object other than a work machine at work in a work area has entered the work area. FIG. 1 is a side view of a work machine 20. As illustrated in FIG. 1, the work machine 20 is a machine that performs work using an attachment 30, and is, for example, a hydraulic excavator. The work machine 20 has a machine main body 24 including a lower travelling body 21 and an upper slewing body 22, the attachment 30, and cylinders 40.

The lower travelling body 21 is a portion that causes the work machine 20 to travel, and includes, for example, a crawler. The upper slewing body 22 is slewably attached to an upper part of the lower travelling body 21 via a slewing device 25. A cab (driver's cabin) 23 is provided at a front part of the upper slewing body 22.

The attachment 30 is attached to the upper slewing body 22 to be rotatable in an up-and-down direction. The attachment 30 includes a boom 31, an arm 32, and a bucket 33. The boom 31 is attached to the upper slewing body 22 to be rotatable in an up-and-down direction (capable of rising and contracting). The arm 32 is attached to the boom 31 to be rotatable in an up-and-down direction. The bucket 33 is attached to the arm 32 to be rotatable in a front-and-rear direction. The bucket 33 is a portion that performs work including excavation, leveling, and scooping of soil and sand (transport object). Note that the transport object that is held by the bucket 33 is not limited to soil and sand, and may be a stone or a waste (industrial waste or the like).

The cylinders 40 can hydraulically move the attachment 30 rotationally. The cylinders 40 are hydraulic telescopic cylinders. The cylinders 40 include a boom cylinder 41, an arm cylinder 42, and a bucket cylinder 43.

The boom cylinder 41 rotationally moves the boom 31 with respect to the upper slewing body 22. The boom cylinder 41 has a base end portion rotatably attached to the upper slewing body 22. The boom cylinder 41 has a distal end portion rotatably attached to the boom 31.

The arm cylinder 42 rotationally moves the arm 32 with respect to the boom 31. The arm cylinder 42 has a base end portion rotatably attached to the boom 31. The arm cylinder 42 has a distal end portion rotatably attached to the arm 32.

The bucket cylinder 43 rotationally moves the bucket 33 with respect to the arm 32. The bucket cylinder 43 has a base end portion rotatably attached to the arm 32. The bucket cylinder 43 has a distal end portion rotatably attached to a link member 34 rotatably attached to the bucket 33.

The work machine 20 further includes an angle sensor 52, and inclination angle sensors 60.

The angle sensor 52 detects a slewing angle of the upper slewing body 22 with respect to the lower travelling body 21. The angle sensor 52 is, for example, an encoder, a resolver, or a gyro sensor. In the present embodiment, the slewing angle of the upper slewing body 22 at a time when a front side of the upper slewing body 22 coincides with a front side of the lower travelling body 21 is 0°.

The inclination angle sensors 60 detect an orientation of the attachment 30. The inclination angle sensors 60 includes a boom inclination angle sensor 61, an arm inclination angle sensor 62, and a bucket inclination angle sensor 63.

The boom inclination angle sensor 61 is attached to the boom 31 and detects an orientation of the boom 31. The boom inclination angle sensor 61 is a sensor that acquires an inclination angle of the boom 31 with respect to a horizontal line, and is, for example, an inclination (acceleration) sensor or the like. Note that the boom inclination angle sensor 61 may be a rotation angle sensor that detects a rotation angle of a boom foot pin (a base end of the boom) or a stroke sensor that detects a stroke amount of the boom cylinder 41.

The arm inclination angle sensor 62 is attached to the arm 32 to detect an orientation of the arm 32. The arm inclination angle sensor 62 is a sensor that acquires an inclination angle of the arm 32 with respect to the horizontal line, and is, for example, an inclination (acceleration) sensor or the like. Note that the arm inclination angle sensor 62 may be a rotation angle sensor that detects a rotation angle of an arm connection pin (a base end of the arm) or a stroke sensor that detects a stroke amount of the arm cylinder 42.

The bucket inclination angle sensor 63 is attached to the link member 34 to detect an orientation of the bucket 33. The bucket inclination angle sensor 63 is a sensor that acquires an inclination angle of the bucket 33 with respect to the horizontal line, and is, for example, an inclination (acceleration) sensor or the like. Note that the bucket inclination angle sensor 63 may be a rotation angle sensor that detects a rotation angle of a bucket connection pin (a base end of the bucket) or a stroke sensor that detects a stroke amount of the bucket cylinder 43.

Figure 2:
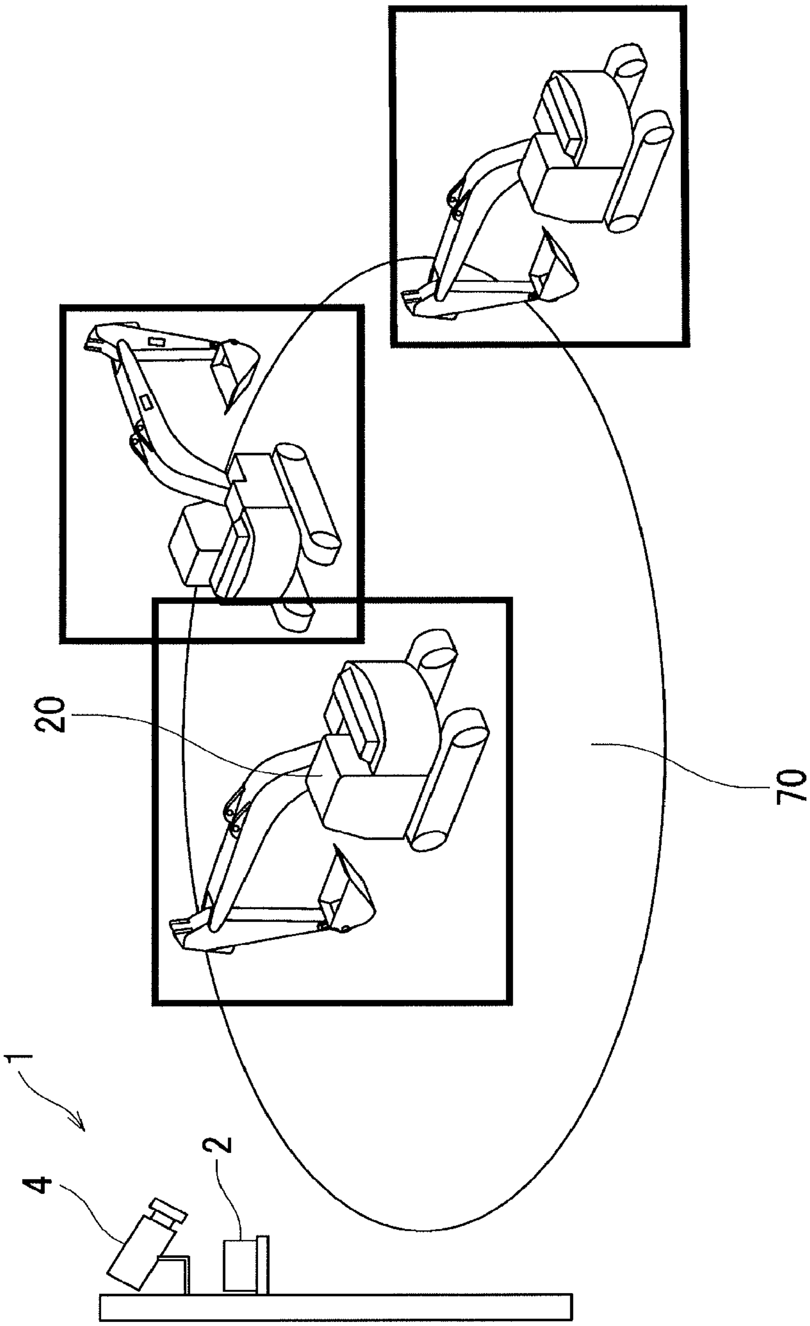
FIG. 2 is a diagram illustrating a state where the work machine according to each embodiment of the present invention is at work in a work area.

FIG. 2 is a diagram illustrating the work machine 20 at work in a work area. As illustrated in FIG. 2, the work machine 20 performs work in a work area 70. An intrusion detection system 1 detects that an object other than the work machine 20 at work in the work area 70 has entered the work area 70, on the outside of the work area 70. In this case, the work machine 20 at work in the work area 70 has to be distinguished from an object other than the work machine 20, the object having entered the work area 70.

(Circuit Configuration of Intrusion Detection System and Work Machine)

Figure 3:
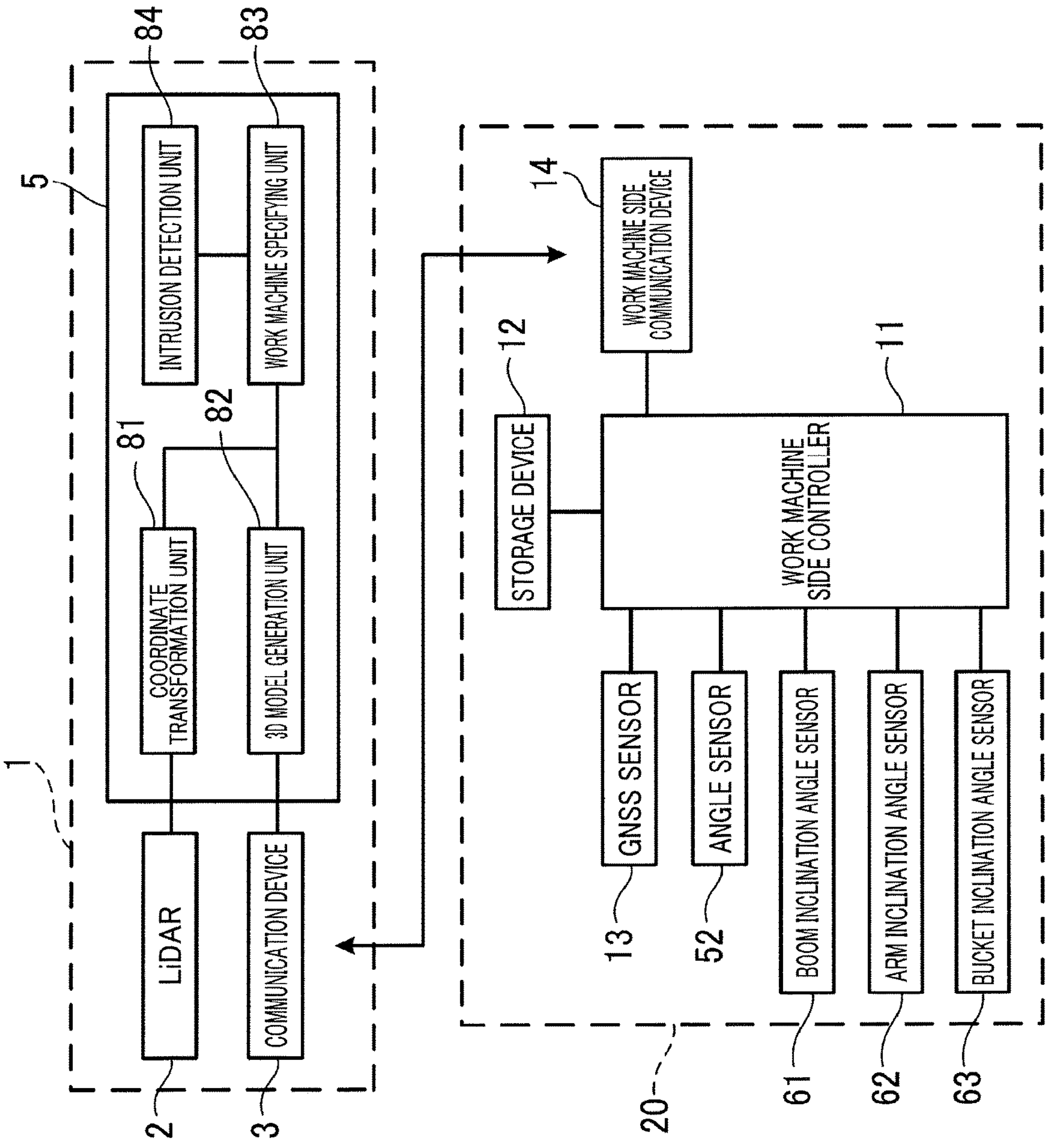
FIG. 3 is a block diagram of an intrusion detection system and the work machine according to a first embodiment of the present invention.

FIG. 3 is a block diagram of the intrusion detection system 1 and the work machine 20. As illustrated in FIG. 3, the work machine 20 includes a work machine side controller 11, a storage device 12, a GNSS sensor 13, and a work machine side communication device 14.

The work machine side controller 11 receives information about a slewing angle (orientation) of the upper slewing body 22 with respect to the lower travelling body 21, the slewing angle being detected by the angle sensor 52. Further, the work machine side controller 11 receives information about the orientation of the boom 31, the orientation being detected by the boom inclination angle sensor 61. Further, the work machine side controller 11 receives information about the orientation of the arm 32, the orientation being detected by the arm inclination angle sensor 62. Further, the work machine side controller 11 receives information about the orientation of the bucket 33, the orientation being detected by the bucket inclination angle sensor 63.

The storage device 12 stores information about dimensions of the work machine 20 (dimensions of the attachment 30) and a shape of the work machine 20 (a shape of the attachment 30).

The GNSS (global navigation satellite system) sensor (machine position acquisition unit) 13 acquires the position of the work machine 20 at work in the work area. The GNSS sensor 13 is a positioning sensor, and acquires a position (position information) of the work machine 20 in a global coordinate system (predetermined coordinate system). Note that, instead of the GNSS sensor 13, the positioning sensor such as a global positioning system (GPS) sensor or a distance measurement sensor such as a total station may be used.

The work machine side communication device 14 is communicable with a communication device 3, described later, of the intrusion detection system 1.

The intrusion detection system 1 includes a LiDAR 2, the communication device 3, and the controller 5.

Figure 4:
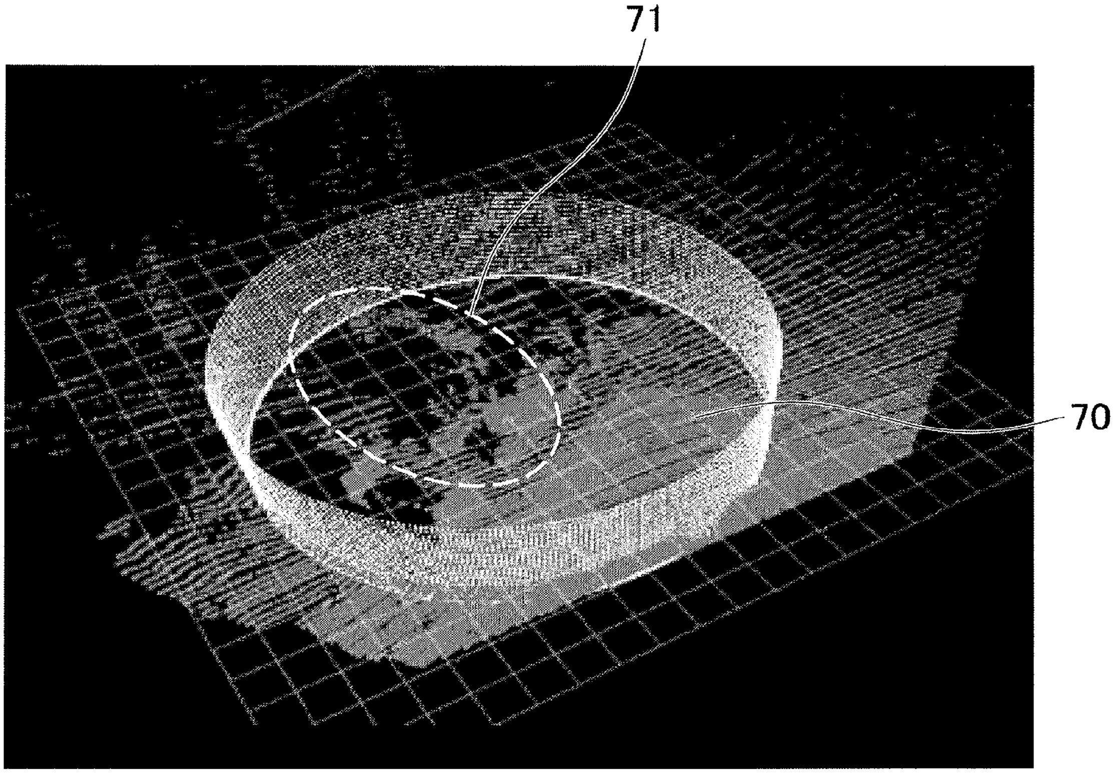
FIG. 4 is a diagram illustrating an example of point cloud data acquired by a LiDAR device.

As illustrated in FIG. 2, the LiDAR (Light Detection and Ranging or Laser Imaging Detection and Ranging) (point cloud data acquisition unit) 2 is provided outside the work area 70. The LiDAR 2 acquires point cloud data indicating a distance from a position (a predetermined reference point) where the LiDAR 2 is attached to an object located inside or outside the work area 70. An example of the point cloud data acquired by the LiDAR 2 is illustrated in FIG. 4. The inside of a cylinder illustrated in the middle of the drawing is the work area 70.

Returning to FIG. 3, the communication device 3 is communicable with the work machine side communication device 14 of the work machine 20. The communication device 3 receives, from the work machine 20, the information about the position of the work machine 20, the position being acquired by the GNSS sensor 13. Further, the communication device 3 receives, from the work machine 20, information about the dimensions of the work machine 20 (the dimensions of the attachment 30) and the shape of the work machine 20 (the shape of the attachment 30), the information being stored in the storage device 12. In addition, the communication device 3 receives, from the work machine 20, information about the orientations of the work machine 20 (the orientation of the upper slewing body 22 and the orientation of the attachment 30), the orientations being detected respectively by the angle sensor 52 and the inclination angle sensors 60 (the boom inclination angle sensor 61, the arm inclination angle sensor 62, and the bucket inclination angle sensor 63).

The controller 5 includes a coordinate transformation unit 81, a 3D model generation unit 82, a work machine specifying unit 83, and an intrusion detection unit 84.

The coordinate transformation unit (a position calculation unit) 81 calculates the positions of respective points of the point cloud data acquired by the LiDAR 2. Specifically, the coordinate transformation unit 81 calculates the positions (three-dimensional coordinates) of the respective points of the point cloud data in the global coordinate system using the position (coordinates) of the global coordinate system to which the LiDAR 2 is attached and the distances from the LiDAR 2 to the respective points of the point cloud data.

Figure 5:
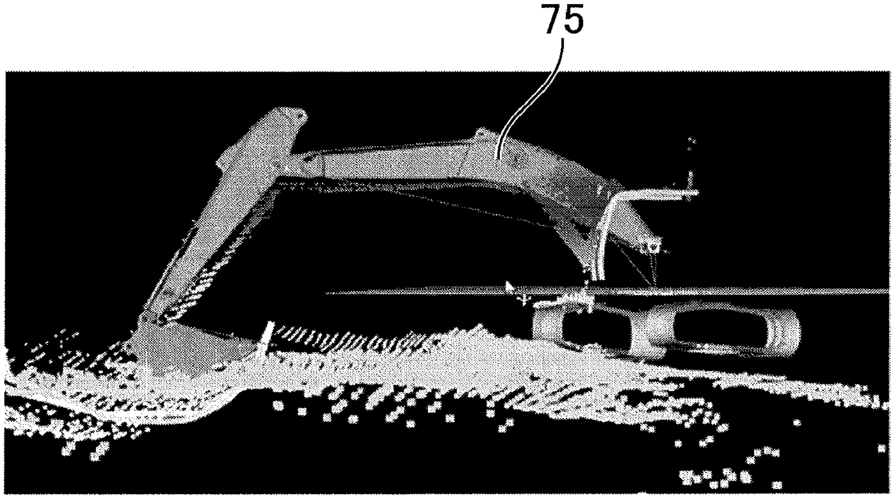
FIG. 5 is a diagram illustrating an example of three-dimensional shape data of the work machine, the three-dimensional shape data being calculated by a three-dimensional shape data calculation unit.

The 3D model generation unit (a three-dimensional shape data calculation unit) 82 calculates three-dimensional shape data of the work machine 20 based on the information about the dimensions, shape, and orientation of the work machine 20, the information being received by the communication device 3. FIG. 5 illustrates an example of three-dimensional shape data 75 of the work machine 20, the three-dimensional data being calculated by the 3D model generation unit 82. Note that the 3D model generation unit 82 may calculate the three-dimensional shape data of the work machine 20 using at least one piece of the information about the dimensions, shape, and orientation of the work machine 20, or may calculate the three-dimensional shape data of the work machine 20 using all pieces of the information.

Returning to FIG. 3, the work machine specifying unit (a specifying unit) 83 specifies, as specific data, a portion corresponding to the work machine 20 in the point cloud data, based on the position of the work machine 20 and the positions of the points of the point cloud data in the global coordinate system. First, the work machine specifying unit (superimposing unit) 83 superimposes, at the position of the work machine 20, the three-dimensional shape data calculated by the 3D model generation unit 82 on the point cloud data. In FIG. 4, the three-dimensional shape data 75 illustrated in FIG. 5 is superimposed on the point cloud data, in a region surrounded by a dotted line 71. The work machine specifying unit 83 specifies, as the specific data, the portion superimposed by the three-dimensional shape data 75 in the point cloud data. As a result, it is possible to know which portion of the point cloud data corresponds to the work machine 20.

Returning to FIG. 3, the intrusion detection unit (a detection unit) 84 detects that another object different from the work machine 20 has entered the work area, based on the remaining portion of the point cloud data other than the specific data in the point cloud data acquired by the LiDAR 2. Since in the point cloud data the portion corresponding to the work machine 20 at work in the work area 70 is specified as the specific data, the point cloud data that excludes the specific data and has entered the work area 70 is for an object other than the work machine 20 at work in the work area 70. As a result, an accurate detect can be made that an object other than the work machine 20 at work in the work area 70 has entered the work area 70.

As described above, in the intrusion detection system 1 according to the present embodiment, the portion corresponding to the work machine 20 at work in the work area 70 is specified as the specific data from the point cloud data. Then, a detection is made that an object has entered the work area 70, based on the point cloud data excluding the specific data. Since in the point cloud data the portion corresponding to the work machine 20 at work in the work area 70 is specified as the specific data, the point cloud data that excludes the specific data and has entered the work area 70 is for an object other than the work machine 20 at work in the work area 70. As a result, an accurate detect can be made that an object other than the work machine 20 at work in the work area 70 has entered the work area 70.

Further, the machine position acquisition unit is a positioning sensor such as the GNSS sensor 13 or a distance measurement sensor. As a result, the position of the work machine 20 at work in the work area 70 can be accurately acquired. Therefore, the specific data can be accurately specified from the point cloud data.

In addition, a portion superimposed by the three-dimensional shape data 75 of the work machine 20 in the point cloud data is specified as the specific data. The specific data can be accurately specified by using the three-dimensional shape data 75 of the work machine 20.

Second Embodiment

Next, an intrusion detection system 101 according to a second embodiment will be described with reference to the drawings. Note that the configuration common to the first embodiment and the effect obtained by the configuration will not be described, and points different from the first embodiment will mainly be described. Note that the same members as those in the first embodiment are denoted by the same reference numerals as those in the first embodiment.

In the first embodiment, the 3D model generation unit 82 calculates the three-dimensional shape data 75 of the work machine 20, and the work machine specifying unit 83 superimposes the calculated three-dimensional shape data 75 on the point cloud data to specify the specific data. On the other hand, in the present embodiment, the point cloud data acquired by the LiDAR 2 is clustered into a cluster point cloud, and the cluster point cloud that coincides with the position of the work machine 20 is specified as the specific data. Note that clustering is a type of unsupervised learning in machine learning, and is a method for grouping data based on similarity between data.

(Circuit Configuration of Intrusion Detection System and Work Machine)

Figure 6:
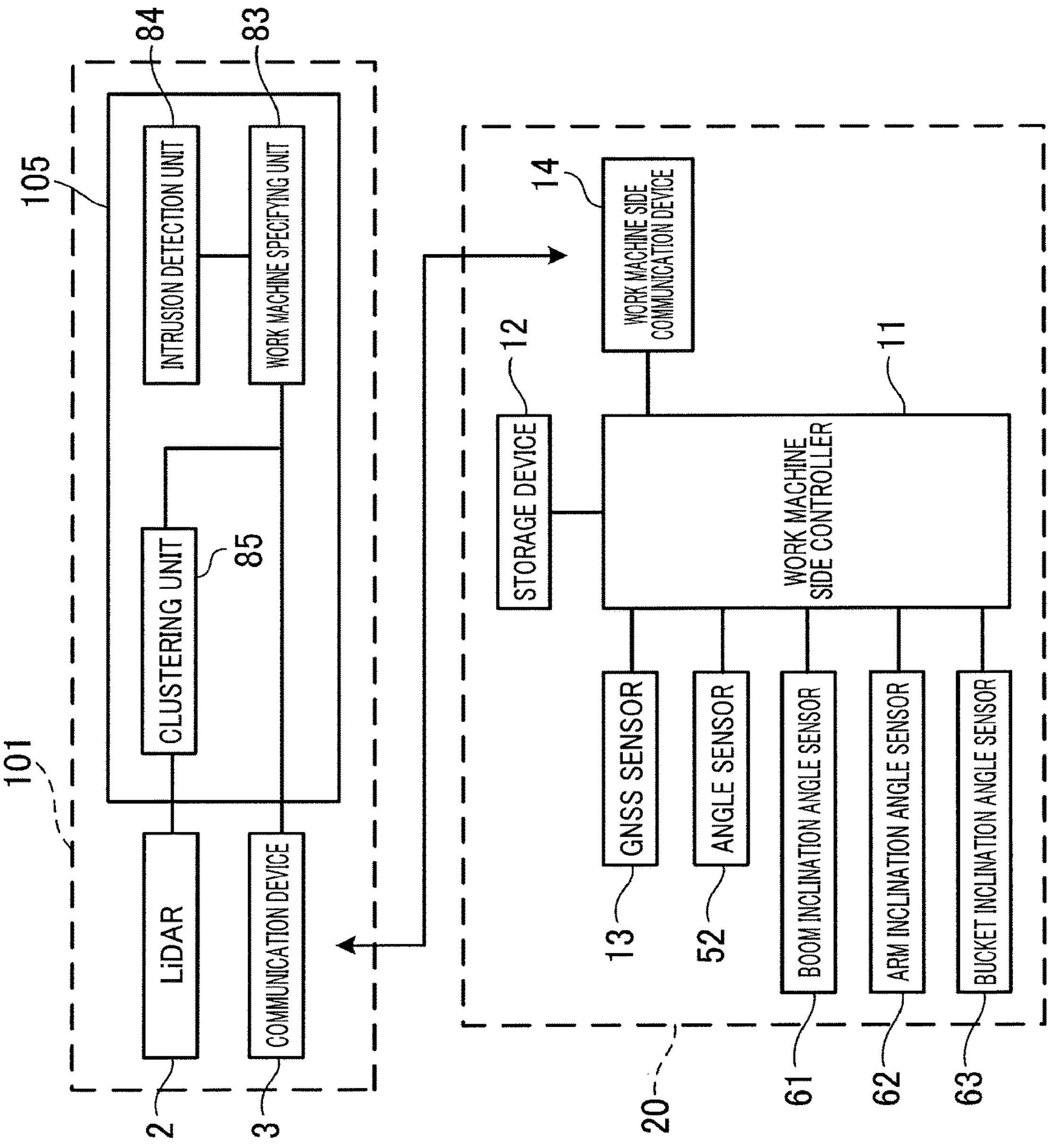
FIG. 6 is a block diagram of an intrusion detection system and the work machine according to a second embodiment of the present invention.

FIG. 6 is a block diagram of the intrusion detection system 101 and the work machine 20. As illustrated in FIG. 6, a controller 105 of the intrusion detection system 101 includes a clustering unit 85, the work machine specifying unit 83, and the intrusion detection unit 84.

Figure 7:
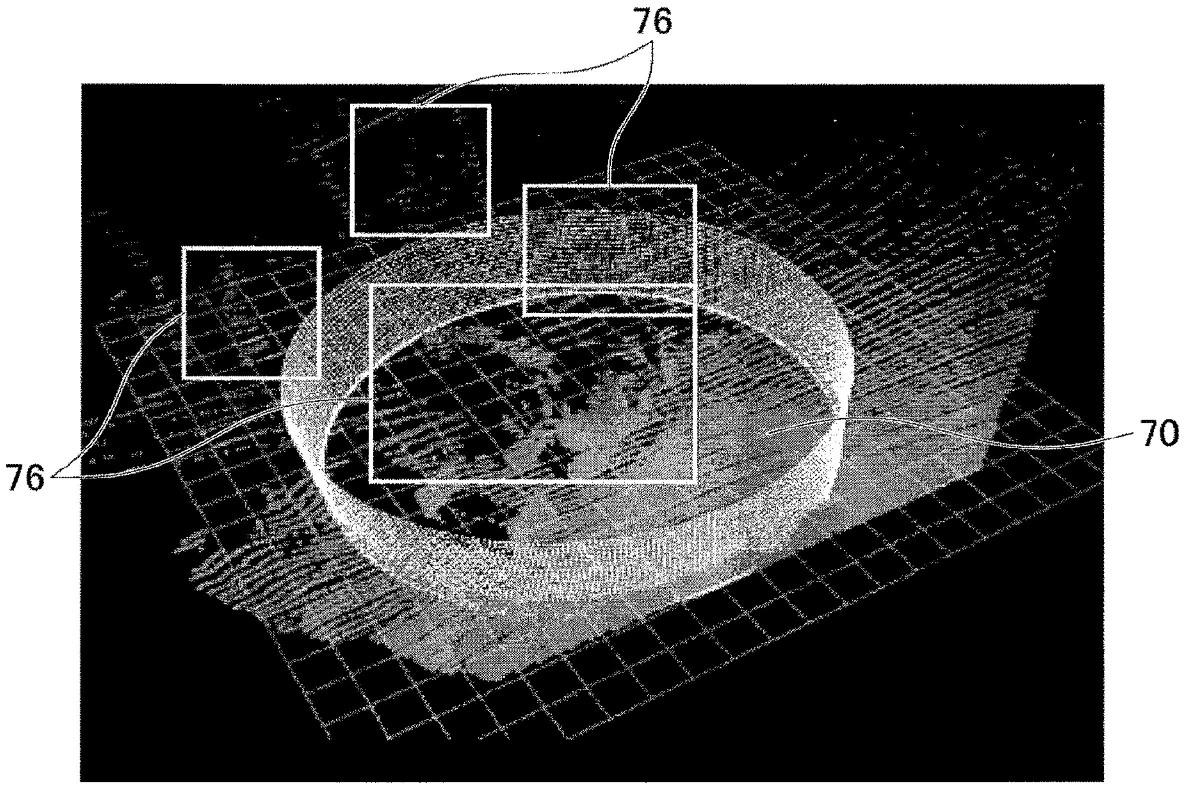
FIG. 7 is a diagram illustrating an example of a cluster point cloud located inside and outside the work area.

The clustering unit (a clustering unit) 85 clusters the point cloud data acquired by the LiDAR 2 into cluster point clouds. FIG. 7 illustrates an example of cluster point clouds 76 located inside and outside the work area 70. The clustering unit (the position calculation unit) 85 calculates the positions of the cluster point clouds 76 in the global coordinate system using the position (coordinates) in the global coordinate system to which the LiDAR 2 is attached and the distances from the LiDAR 2 to the cluster point clouds 76.

The work machine specifying unit 83 specifies a cluster point cloud that matches with the position of the work machine 20, the position being acquired by the GNSS sensor 13, as specific data. The intrusion detection unit 84 detects that an object has entered the work area 70, based on the point cloud data excluding the specific data.

In such a manner, the specific data can be easily specified by clustering the point cloud data into the cluster point clouds. In addition, since the three-dimensional shape data 75 of the work machine 20 does not have to be calculated, the specifying is not easily affected by noise. Further, even with the work machine 20 having different dimensions, the specific data can be suitably specified by clustering the point cloud data. Since the other parts are the same as those of the first embodiment, the description thereof will be omitted.

As described above, in the intrusion detection system 101 according to the present embodiment, the cluster point cloud that matches with the position of the work machine 20 is specified as the specific data. The specific data can be easily specified by clustering the point cloud data into the cluster point clouds. In addition, since the three-dimensional shape data 75 of the work machine 20 does not have to be calculated, the specifying is not easily affected by noise.

Further, even with the work machine 20 having different dimensions, the specific data can be suitably specified by clustering the point cloud data.

Third Embodiment

Next, an intrusion detection system 201 according to a third embodiment will be described with reference to the drawings. Note that the configuration common to the second embodiment and the effect obtained by the configuration will not be described, and points different from the second embodiment will mainly be described. Note that the same members as those in the second embodiment are denoted by the same reference numerals as those in the second embodiment.

In the first embodiment and the second embodiment, the specific data is specified by using the information about the position of the work machine 20, the information being acquired by the GNSS sensor 13. On the other hand, in the present embodiment, the position of the work machine 20 is acquired by using the camera 4 (see FIG. 2).

(Circuit Configuration of Intrusion Detection System and Work Machine)

Figure 8:
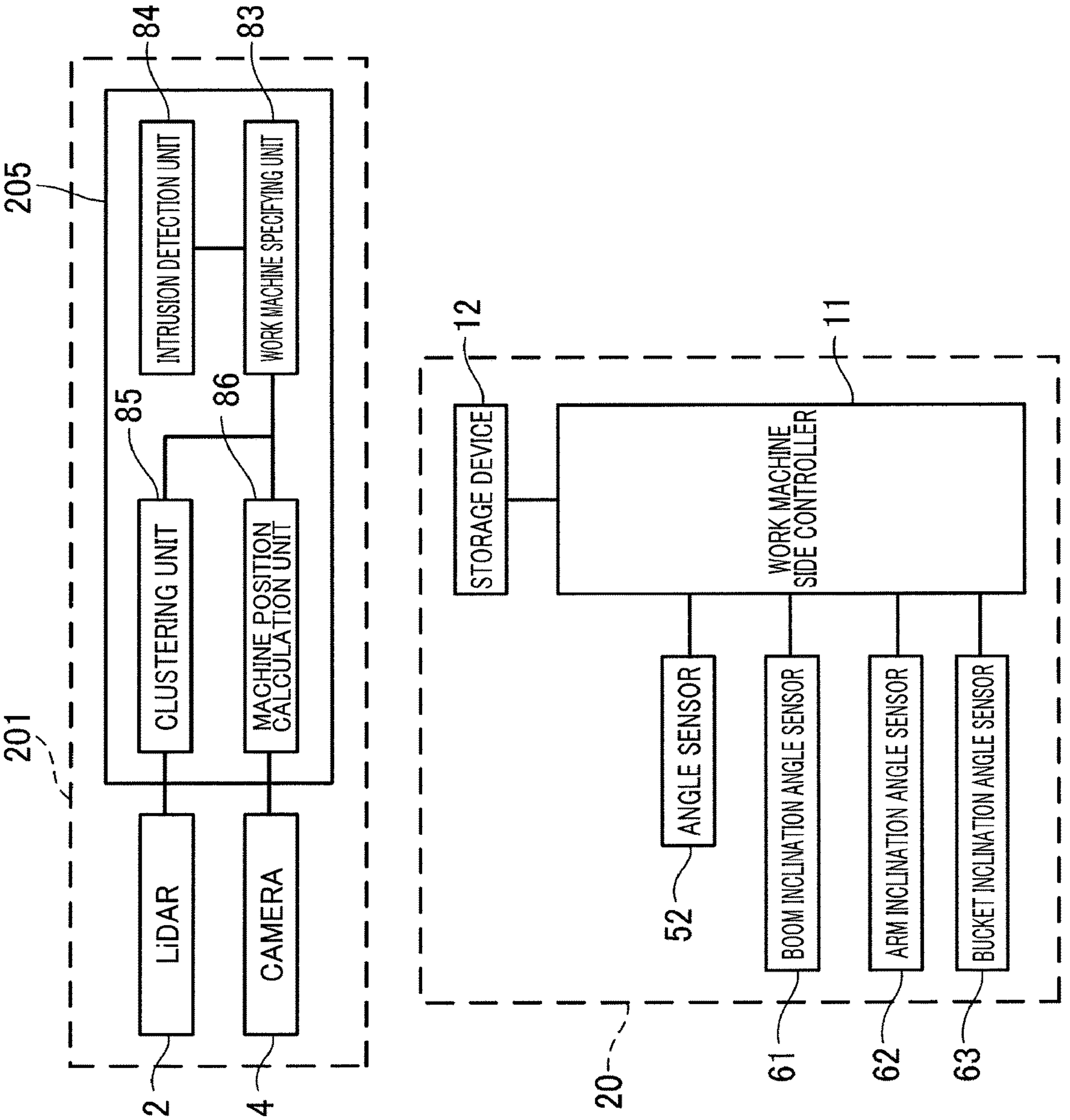
FIG. 8 is a block diagram of the intrusion detection system and the work machine according to a third embodiment of the present invention.

FIG. 8 is a block diagram of the intrusion detection system 201 and the work machine 20. As illustrated in FIG. 8, the intrusion detection system 201 includes the LiDAR 2, a camera 4, and a controller 205. The controller 205 includes the clustering unit 85, a machine position calculation unit 86, the work machine specifying unit 83, and the intrusion detection unit 84. The camera 4 and the machine position calculation unit 86 constitute a machine position acquisition unit.

As illustrated in FIG. 1, the upper slewing body 22 of the work machine 20 is provided with a mark 90 for enabling acquisition of (acquiring) the position of the work machine 20 from outside of the work machine 20. In the present embodiment, the mark 90 is an augmented reality (AR) marker. The AR marker is a sign in which an image to be superimposed and displayed in a real space in AR and identification information for designating a position of the image are written. Note that the mark 90 may be capable of acquiring information such as the dimensions of the work machine 20 from outside of the work machine 20 in addition to the information about the position of the work machine 20.

As illustrated in FIG. 2, the camera (imaging unit) 4 is disposed outside the work area 70. The camera 4 images the mark 90 provided on the upper slewing body 22.

Returning to FIG. 8, the machine position calculation unit (a machine position calculation unit) 86 calculates the position of the work machine 20 based on the mark 90 imaged by the camera 4. The machine position calculation unit 86 calculates the position of the mark 90 in the global coordinate system using the position (coordinates) in the global coordinate system to which the camera 4 is attached and the distance from the camera 4 to the mark 90. As an example, the marker position in the coordinate system with the camera 4 being an origin can be estimated based on the size of the mark 90 in the captured image of the camera 4. At this time, communication between the intrusion detection system 201 (outside the work machine 20) and the work machine 20 does not have to be performed. Therefore, even in a case where the work machine 20 does not include a communication device, the position of the work machine 20 can be acquired.

The clustering unit 85 clusters the point cloud data acquired by the LiDAR 2 into cluster point clouds. The work machine specifying unit 83 specifies a cluster point cloud matching with the position of the work machine 20, as specific data. The intrusion detection unit 84 detects that an object has entered the work area 70, based on the point cloud data excluding the specific data. Since the other parts are the same as those in the second embodiment, the description thereof will be omitted.

As described above, in the intrusion detection system 201 according to the present embodiment, the position of work machine 20 is calculated based on the mark 90 imaged by camera 4. At this time, the communication between the outside of the work machine 20 and the work machine 20 does not have to be performed. Therefore, even in a case where the work machine 20 does not include a communication device, the position of the work machine 20 can be acquired.

Although the embodiments of the present invention have been described above, only specific examples have been described, and the present invention is not particularly limited to the embodiments. Therefore, a specific configuration and the like can be modified in design as appropriate. In addition, the actions and effects described in the embodiments of the present invention merely recite the most suitable actions and effects resulting from the present invention, and the actions and effects according to the present invention are not limited to those described in the embodiments of the present invention.

The point cloud data acquisition unit exemplified as the LiDAR 2 is not limited to one provided outside the work area 70. In a case where the LiDAR 2 is mounted on a drone, not illustrated, and the drone is located above the work machine 20, the LiDAR 2 may be inside the work area 70 or outside the work area 70.

The present invention provides an intrusion detection system. The intrusion detection system includes a machine position acquisition unit that acquires a position of a work machine at work inside a work area in a predetermined coordinate system, a point cloud data acquisition unit that acquires point cloud data indicating a distance from a predetermined reference point to an object located inside or outside the work area, a position calculation unit that calculates positions of respective points of the point cloud data in the coordinate system, a specifying unit that specifies, as specific data, a portion corresponding to the work machine from the point cloud data, based on the position of the work machine and the positions of the respective points of the point cloud data in the coordinate system, and a detection unit that detects that another object different from the work machine has entered the work area, based on remaining portion of the point cloud data other than the specific data in the point cloud data.

In the above configuration, the machine position acquisition unit may be a positioning sensor or a distance measurement sensor.

In the above configuration, the work machine is provided with a mark for acquiring a position of the work machine from outside the work machine, and the machine position acquisition unit includes an imaging unit that images the mark, and a machine position calculation unit that calculates a position of the work machine in the coordinate system based on the mark imaged by the imaging unit.

The above configuration further includes a three-dimensional shape data calculation unit that calculates three-dimensional shape data of the work machine based on at least one of dimensions, a shape, and an orientation of the work machine, and a superimposing unit that superimposes the three-dimensional shape data on the point cloud data in correspondence with the position of the work machine, in which the specifying unit specifies, as the specific data, a portion on which the three-dimensional shape data is superimposed in the point cloud data.

The above configuration further includes a clustering unit that clusters the point cloud data into cluster point clouds. The position calculation unit calculates positions of the cluster point clouds in the coordinate system, and the specifying unit specifies, as the specific data, a cluster point cloud matching with the position of the work machine among the cluster point clouds.

According to the present invention, the portion corresponding to the work machine at work in the work area is specified as the specific data from the point cloud data. Then, a detection is made that an object has entered the work area, based on the point cloud data excluding the specific data. Since in the point cloud data the portion corresponding to the work machine at work in the work area is specified as the specific data, the point cloud data that has entered the work area and excludes the specific data is for an object other than the work machine at work in the work area.

As a result, an accurate detect can be made that an object other than the work machine at work in the work area has entered the work area.

The invention claimed is:

1. An intrusion detection system comprising:

a machine position acquisition unit that acquires a position of a work machine at work inside a work area in a predetermined coordinate system;

a point cloud data acquisition unit that acquires point cloud data indicating a distance from a predetermined reference point to an object located inside or outside the work area;

a position calculation unit that calculates positions of respective points of the point cloud data in the coordinate system, based on a position in the coordinate system to which the point cloud data acquisition unit is attached and distances from the point cloud data acquisition unit to respective points of the point cloud data;

a specifying unit that specifies in advance, as specific data, a portion corresponding to the work machine from the point cloud data, based on the position of the work machine and the positions of the respective points of the point cloud data in the coordinate system; and a detection unit that detects that another object different from the work machine has entered the work area, based on remaining portion of the point cloud data other than the specific data prespecified in the point cloud data.

2. The intrusion detection system according to claim 1, wherein the machine position acquisition unit includes a positioning sensor or a distance measurement sensor.

3. The intrusion detection system according to claim 1, further comprising:

a three-dimensional shape data calculation unit that calculates three-dimensional shape data of the work machine based on at least one of dimensions, a shape, and an orientation of the work machine; and a superimposing unit that superimposes the three-dimensional shape data on the point cloud data in correspondence with a position of the work machine, wherein the specifying unit specifies, as the specific data, a portion on which the three-dimensional shape data is superimposed in the point cloud data.

4. The intrusion detection system according to claim 1, further comprising a communication device that is communicable with the work machine, the machine position acquisition unit is provided on the work machine, the communication device receives, from the work machine, information about the position of the work machine, the position being acquired by the machine position acquisition unit, the specifying unit specifies the specific data based on the information about the position of the work machine.

5. The intrusion detection system according to claim 1, wherein the detection unit identifies the point cloud data other than the specific data as an object other than the work machine at work in the work area, and detects the object other than the work machine as an object having entered the work area.

6. An intrusion detection system comprising:

a machine position acquisition unit that acquires a position of a work machine at work inside a work area in a predetermined coordinate system;

a point cloud data acquisition unit that acquires point cloud data indicating a distance from a predetermined reference point to an object located inside or outside the work area;

a position calculation unit that calculates positions of respective points of the point cloud data in the coordinate system;

a specifying unit that specifies, as specific data, a portion corresponding to the work machine from the point cloud data, based on the position of the work machine and the positions of the respective points of the point cloud data in the coordinate system; and a detection unit that detects that another object different from the work machine has entered the work area, based on remaining portion of the point cloud data other than the specific data in the point cloud data, wherein the work machine is provided with a mark for acquiring a position of the work machine from outside the work machine, and the machine position acquisition unit includes an imaging unit that images the mark, and a machine position calculation unit that calculates the position of the work machine in the coordinate system based on the mark imaged by the imaging unit.

7. The intrusion detection system according to claim 6, further comprising a communication device that is communicable with the work machine, the machine position acquisition unit is provided on the work machine, the communication device receives, from the work machine, information about the position of the work machine, the position being acquired by the machine position acquisition unit, the specifying unit specifies the specific data based on the information about the position of the work machine.

8. The intrusion detection system according to claim 6, wherein the detection unit identifies the point cloud data other than the specific data as an object other than the work machine at work in the work area, and detects the object other than the work machine as an object having entered the work area.

9. An intrusion detection system comprising:

a machine position acquisition unit that acquires a position of a work machine at work inside a work area in a predetermined coordinate system:

a point cloud data acquisition unit that acquires point cloud data indicating a distance from a predetermined reference point to an object located inside or outside the work area;

a position calculation unit that calculates positions of respective points of the point cloud data in the coordinate system;

a specifying unit that specifies, as specific data, a portion corresponding to the work machine from the point cloud data, based on the position of the work machine and the positions of the respective points of the point cloud data in the coordinate system; and a detection unit that detects that another object different from the work machine has entered the work area; based on remaining portion of the point cloud data other than the specific data in the point cloud data; and a clustering unit that clusters the point cloud data into cluster point clouds, wherein the position calculation unit calculates positions of the cluster point clouds in the coordinate system, and the specifying unit specifies, as the specific data, a cluster point cloud matching with the position of the work machine among the cluster point clouds.

10. The intrusion detection system according to claim 9, further comprising a communication device that is communicable with the work machine, the machine position acquisition unit is provided on the work machine, the communication device receives, from the work machine, information about the position of the work machine, the position being acquired by the machine position acquisition unit, the specifying unit specifies the specific data based on the information about the position of the work machine.

11. The intrusion detection system according to claim 9, wherein the detection unit identifies the point cloud data other than the specific data as an object other than the work machine at work in the work area, and detects the object other than the work machine as an object having entered the work area.

* * * * *